(12) United States Patent
Huang et al.

(10) Patent No.: US 11,385,441 B2
(45) Date of Patent: Jul. 12, 2022

(54) PROJECTION LENS ASSEMBLY (71) Applicant: ZHEJIANG SUNNY OPTICAL CO., LTD., Ningbo (CN)

(72) Inventors: Lin Huang, Ningbo (CN); Litong Song, Ningbo (CN)

(73) Assignee: ZHEJIANG SUNNY OPTICAL CO., LTD.

(*) Notice: Subject to any disclaimer, the term of this patent is extended or adjusted under 35 U.S.C. 154(b) by 558 days.

(21) Appl. No.: 16/226,951

(22) Filed: Dec. 20, 2018

(65) Prior Publication Data

US 2019/0170972 A1 Jun. 6, 2019

Related U.S. Application Data (63) Continuation of application No. PCT/CN2018/086743, filed on May 14, 2018.

(30) Foreign Application Priority Data

Dec. 4, 2017 (CN) .......................... 201711260269.3
Dec. 4, 2017 (CN) .......................... 201721662767.6

(51) Int. Cl.
*G02B 13/00* (2006.01)
*G02B 9/34* (2006.01)

(52) U.S. Cl.
CPC ............. *G02B 13/004* (2013.01); *G02B 9/34* (2013.01); *G02B 13/008* (2013.01)

(58) Field of Classification Search
CPC ...... G02B 13/004; G02B 9/34; G02B 13/008; G02B 13/14; G02B 13/16
See application file for complete search history.

(56) References Cited

U.S. PATENT DOCUMENTS 4,577,935 A * 3/1986 Yamakawa ............... G02B 9/12
359/651
4,620,773 A * 11/1986 Fukuda .................... G02B 9/34
348/E5.138

(Continued)

FOREIGN PATENT DOCUMENTS

CN 202929277 U 5/2013
CN 105319671 A 2/2016

(Continued)

OTHER PUBLICATIONS

PCT International Search Report and Written Opinion completed by the ISA/CN dated Sep. 7, 2018 and issued in connection with PCT/CN2018/086743.

(Continued)

*Primary Examiner* — Derek S. Chapel
*Assistant Examiner* — Adam W Booher
(74) *Attorney, Agent, or Firm* — Barnes & Thornburg LLP (57) ABSTRACT

The present disclosure discloses a projection lens assembly. The projection lens assembly includes, sequentially along an optical axis from an image side to a source side, a first lens, a second lens, a third lens, and a fourth lens. The first lens has a positive refractive power, and an image-side surface of the first lens is a convex surface. The second lens has a positive refractive power or a negative refractive power, and a source-side surface of the second lens is a convex surface. The third lens has a positive refractive power. The fourth lens has a positive refractive power or a negative refractive power.

18 Claims, 5 Drawing Sheets

(56) References Cited

U.S. PATENT DOCUMENTS

| | | | | |
|---|---|---|---|---|
| 4,666,261 A | * | 5/1987 | Arai | G02B 9/34 359/708 |
| 4,707,084 A | * | 11/1987 | Betensky | G02B 9/34 359/650 |
| 4,776,681 A | * | 10/1988 | Moskovich | G02B 9/34 359/649 |
| 7,433,135 B2 | * | 10/2008 | Sun | G02B 9/34 359/569 |
| 9,329,361 B1 | * | 5/2016 | Liu | G02B 13/004 |
| 10,495,846 B2 | * | 12/2019 | Lin | G02B 27/0961 |
| 2003/0071929 A1 | * | 4/2003 | Moskovich | H04N 9/18 348/779 |
| 2008/0239509 A1 | * | 10/2008 | Vinogradov | G06K 7/10722 359/709 |
| 2009/0073571 A1 | * | 3/2009 | Lin | G02B 13/005 359/650 |
| 2010/0165483 A1 | * | 7/2010 | Tang | G02B 13/004 359/715 |
| 2012/0099014 A1 | * | 4/2012 | Huang | G02B 13/004 348/340 |
| 2012/0113310 A1 | * | 5/2012 | Huang | G02B 9/34 348/340 |
| 2016/0274331 A1 | | 9/2016 | Hsueh et al. | |
| 2017/0123192 A1 | | 5/2017 | Scepanovic et al. | |
| 2018/0136440 A1 | | 5/2018 | Hsueh et al. | |
| 2019/0101724 A1 | * | 4/2019 | Chen | G02B 9/34 |

FOREIGN PATENT DOCUMENTS

| | | |
|---|---|---|
| CN | 205485013 U | 8/2016 |
| CN | 107024758 A | 8/2017 |
| CN | 107144943 A | 9/2017 |
| CN | 107193110 A | 9/2017 |
| CN | 107783258 A | 3/2018 |
| CN | 207473185 U | 6/2018 |

OTHER PUBLICATIONS

Intellectual Property of India for Application No. 201817048395, dated Oct. 7, 2020, 5 pages.
Chinese Office Action, dated Mar. 16, 2019, 8 pages.
Chinese Office Action, dated Jan. 12, 2021, 9 pages.

* cited by examiner

PROJECTION LENS ASSEMBLY

CROSS-REFERENCE TO RELATED APPLICATIONS

This application is a continuation of International Application No. PCT/CN2018/086743, filed on May 14, 2018, which claims the priorities and rights to Chinese Patent Application No. 201711260269.3 and Chinese Patent Application No. 201721662767.6 filed with the China National Intellectual Property Administration (CNIPA) on Dec. 4, 2017. All of the aforementioned applications are hereby incorporated by reference in their entireties.

TECHNICAL FIELD

The present disclosure relates to a projection lens assembly, and more specifically to a projection lens assembly including four lenses.

BACKGROUND

In recent years, the depth recognition technology has rapidly developed. A three-dimensional depth camera may obtain the three-dimensional position and the size information of a captured object, which is important in the application of AR (augmented reality) technology.

The coded structured light technique is one of the most important branches of the depth recognition technology. The principle of the coded structured light depth recognition technique is: projecting, by a projection lens assembly module, a specially coded image to the captured object; receiving the reflected pattern information using an image receiving module; and obtaining the depth information of the captured object through back-end algorithm processing. The projection lens assembly, as the core element of the coded structured light depth recognition technique, has a direct impaction on the recognition range and the accuracy of the depth recognition.

Therefore, the object of the present disclosure includes providing a projection lens assembly having features of large field-of-view and miniaturization, to better fulfill the application requirements of the depth recognition projection lens assembly.

SUMMARY

The present disclosure provides a projection lens assembly which may be applicable to portable electronic products and may at least or partially solve at least one of the above disadvantages in the existing technology.

According to an aspect, the present disclosure provides a projection lens assembly. The projection lens assembly includes, sequentially along an optical axis from an image side to a source side, a first lens, a second lens, a third lens, and a fourth lens. The first lens may have a positive refractive power, and an image-side surface of the first lens may be a convex surface. The second lens has a positive refractive power or a negative refractive power, and a source-side surface of the second lens may be a convex surface. The third lens may have a positive refractive power. The fourth lens has a positive refractive power or a negative refractive power.

In an implementation, a maximum incident angle CRA of a chief ray, a total tract length TTL of the projection lens assembly, and a half of a diagonal length IH of a source area may satisfy: $0<(1+TAN(CRA))*TTL/IH<2.5$.

In an implementation, a half of a maximal field-of-view HFOV of the prejection lens assembly may satisfy: $0.9<TAN(HFOV)<1.2$.

In an implementation, a light transmittance of the projection lens assembly may be greater than 85% in a light wave ranging from 800 nm to 1000 nm.

In an implementation, an effective focal length f1 of the first lens and an effective focal length f2 of the second lens may satisfy: $2.0<|f1/f2|<2.8$.

In an implementation, a radius R4 of curvature of the source-side surface of the second lens and a radius R5 of curvature of an image-side surface of the third lens may satisfy: $0.8<R4/R5<1.2$.

In an implementation, a distance SAG31 on the optical axis from an intersection between the image-side surface of the third lens and the optical axis to a vertex of an effective semi-diameter of the image-side surface of the third lens, and a distance SAG32 on the optical axis from an intersection between a source-side surface of the third lens and the optical axis to a vertex of an effective semi-diameter of the source-side surface of the third lens may satisfy: $0.3<SAG31/SAG32<0.7$.

In an implementation, an effective semi-diameter DT11 of the image-side surface of the first lens and an effective semi-diameter DT21 of a source-side surface of the first lens may satisfy: $0.7<DT11/DT21<1.0$.

In an implementation, a center thickness CT3 of the third lens on the optical axis and a center thickness CT4 of the fourth lens on the optical axis may satisfy: $1.5<CT3/CT4<2.5$.

In an implementation, a spacing distance T12 on the optical axis between the first lens and the second lens and a spacing distance T23 on the optical axis between the second lens and the third lens may satisfy: $0.4<T12/T23<0.7$.

According to another aspect, the present disclosure further provides a projection lens assembly. The projection lens assembly includes, sequentially along an optical axis from an image side to a source side, a first lens, a second lens, a third lens, and a fourth lens. The first lens may have a positive refractive power, and an image-side surface of the first lens may be a convex surface. The second lens has a positive refractive power or a negative refractive power, and a source-side surface of the second lens may be a convex surface. The third lens may have a positive refractive power. The fourth lens has a positive refractive power or a negative refractive power. An effective focal length f1 of the first lens and an effective focal length f2 of the second lens may satisfy: $2.0<|f1/f2|<2.8$.

According to another aspect, the present disclosure further provides a projection lens assembly. The projection lens assembly includes, sequentially along an optical axis from an image side to a source side, a first lens, a second lens, a third lens, and a fourth lens. The first lens may have a positive refractive power, and an image-side surface of the first lens may be a convex surface. The second lens has a positive refractive power or a negative refractive power, and a source-side surface of the second lens may be a convex surface. The third lens may have a positive refractive power. The fourth lens has a positive refractive power or a negative refractive power. A distance SAG31 on the optical axis from an intersection of an image-side surface of the third lens and the optical axis to a vertex of an effective semi-diameter of the image-side surface of the third lens, and a distance SAG32 on the optical axis from an intersection of a source-side surface of the third lens and the optical axis to a vertex of an effective semi-diameter of the source-side surface of the third lens may satisfy: $0.3<SAG31/SAG32<0.7$.

The present disclosure adopts a plurality of lenses (e.g., four lenses). By reasonably distributing the refractive powers and the surface types of the lenses, the center thicknesses of the lenses, the spacing distances on the optical axis between the lenses, etc., the projection lens assembly has at least one of the beneficial effects such as miniaturization, large field of view, high imaging quality, low sensitivity, and the effect that the depth recognition requirement may be fulfilled.

BRIEF DESCRIPTION OF THE DRAWINGS

By describing non-limiting implementations below in detail and in combination with the accompanying drawings, other features, objectives and advantages of the present disclosure will be more apparent. In the accompanying drawings.

DETAILED DESCRIPTION

For better understanding the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions such as "first" and "second" are only used to distinguish one feature from another, rather than represent any limitations to the features. Thus, without departing from the teachings of the present disclosure, the first lens discussed below may also be referred to as the second lens, and the second lens may also be referred to as the first lens.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens has a convex surface and a position of the convex surface is not defined, at least the portion of the surface of the lens in the paraxial area is the convex surface; and if the surface of the lens has a concave surface and a position of the concave surface is not defined, at least the portion of the surface of the lens in the paraxial area is the concave surface. The surface closest to the source side in each lens is referred to as the source-side surface, and the surface closest to the image side in each lens is referred to as the image-side surface.

It should be further understood that the terms "comprising" "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The projection lens assembly according to exemplary implementations of the present disclosure may include, for example, four lenses (i.e., a first lens, a second lens, a third lens, and a fourth lens) having refractive powers. The four lenses are arranged in sequence along an optical axis from an image side to a source side.

In the exemplary implementations, the first lens may have a positive refractive power, and an image-side surface of the first lens may be a convex surface. The second lens has a positive refractive power or a negative refractive power, and a source-side surface of the second lens may be a convex surface. The third lens may have a positive refractive power. The fourth lens has a positive refractive power or a negative refractive power.

In the exemplary implementations, the second lens may have a positive refractive power, and an image-side surface of the second lens may be a concave surface.

In the exemplary implementations, a source-side surface of the fourth lens may be a concave surface.

In the exemplary implementations, the projection lens assembly of the present disclosure may satisfy the conditional expression $0<(1+\mathrm{TAN}(\mathrm{CRA}))*\mathrm{TTL}/\mathrm{IH}<2.5$. Here, CRA is the maximum incident angle of a chief ray, TTL is the total track length of the projection lens assembly, and IH is the half of the diagonal length of a source area. The total track length of the projection lens assembly refers to the distance on the optical axis from the image-side surface of the first lens to a source plane. For example, the total track length TTL in the present disclosure may refer to the distance on the optical axis from the image-side surface of the first lens to the source plane. More specifically, CRA, TTL, and IH may further satisfy: $2.0<(1+\mathrm{TAN}(\mathrm{CRA}))*\mathrm{TTL}/\mathrm{IH}<2.5$, for example, $2.12 \leq (1+\mathrm{TAN}(\mathrm{CRA}))*\mathrm{TTL}/\mathrm{IH} \leq 2.31$. When the conditional expression $0<(1+\mathrm{TAN}(\mathrm{CRA}))*\mathrm{TTL}/\mathrm{IH}<2.5$ is satisfied, a large field-of-view and a short total track length may be obtained, to fulfill the requirements of large depth recognition range and miniaturization of the projection module.

In the exemplary implementations, the projection lens assembly of the present disclosure may satisfy the conditional expression $2.0<|f1/f2|<2.8$. Here, f1 is the effective focal length of the first lens and f2 is the effective focal length of the second lens. More specifically, f1 and f2 may further satisfy: $2.29 \leq |f1/f2| \leq 2.63$. When the conditional expression $2<|f1/f2|<2.8$ is satisfied, the astigmatic error of the system may be effectively eliminated, to ensure the balance between the imaging qualities in both tangential and sagittal directions.

In the exemplary implementations, the projection lens assembly of the present disclosure may satisfy the conditional expression $0.8<R4/R5<1.2$. Here, R4 is the radius of curvature of the source-side surface of the second lens, and R5 is the radius of curvature of the image-side surface of the third lens. More specifically, R4 and R5 may further satisfy: $0.83 \leq R4/R5=1.07$. When the conditional expression $0.8<R4/R5<1.2$ is satisfied, the field curvature aberration of the system may be effectively corrected, to ensure the balance between the imaging quality of the central area and the imaging quality of the marginal area.

In the exemplary implementations, the projection lens assembly of the present disclosure may satisfy the conditional expression $0.3<\mathrm{SAG}31/\mathrm{SAG}32<0.7$. Here, SAG31 is the distance on the optical axis from the intersection between the image-side surface of the third lens and the optical axis to the vertex of the effective semi-diameter of the image-side surface of the third lens, and SAG32 is the distance on the optical axis from the intersection between the source-side surface of the third lens and the optical axis to the vertex of the effective semi-diameter of the source-side surface of the third lens. More specifically, SAG31 and SAG32 may further satisfy: $0.40<\mathrm{SAG}31/\mathrm{SAG}32<0.60$, for example, $0.50 \leq \mathrm{SAG}31/\mathrm{SAG}32 \leq 0.53$. When the conditional expression $0.3<\mathrm{SAG}31/\mathrm{SAG}32<0.7$ is satisfied, the spherical aberration of the system may be effectively eliminated, to obtain a high-definition image.

In the exemplary implementations, the projection lens assembly of the present disclosure may satisfy the conditional expression $0.7<\mathrm{DT}11/\mathrm{DT}21<1.0$. Here, DT11 is the effective semi-diameter of the image-side surface of the first lens, and DT21 is the effective semi-diameter of the source-side surface of the first lens. More specifically, DT11 and DT21 may further satisfy: $0.86=\mathrm{DT}11/\mathrm{DT}21 \leq 0.95$. Satisfying the conditional expression $0.7<\mathrm{DT}11/\mathrm{DT}21<1.0$ is conductive to obtaining a short total length of the lens assembly, to fulfill the miniaturization requirement of the lens assembly.

In the exemplary implementations, the projection lens assembly of the present disclosure may satisfy the conditional expression $1.5<\mathrm{CT}3/\mathrm{CT}4<2.5$. Here, CT3 is the center thickness of the third lens on the optical axis, and CT4 is the center thickness of the fourth lens on the optical axis. More specifically, CT3 and CT4 may further satisfy: $1.64 \leq \mathrm{CT}3/\mathrm{CT}4 \leq 2.43$. Satisfying the conditional expression $1.5<\mathrm{CT}3/\mathrm{CT}4<2.5$ is conductive to obtaining a large field-of-view and ensuring a high imaging quality.

In the exemplary implementations, the projection lens assembly of the present disclosure may satisfy the conditional expression $0.4<\mathrm{T}12/\mathrm{T}23<0.7$. Here, T12 is the spacing distance on the optical axis between the first lens and the second lens, and T23 is the spacing distance on the optical axis between the second lens and the third lens. More specifically, T12 and T23 may further satisfy: $0.56=\mathrm{T}12/\mathrm{T}23 \leq 0.62$. Satisfying the conditional expression $0.4<\mathrm{T}12/\mathrm{T}23<0.7$ is conductive to reducing the tolerance sensitivity of the lens assembly, to fulfill the processibility requirement of the lens assembly.

In the exemplary implementations, the projection lens assembly of the present disclosure has a light transmittance greater than 85% in a light wave ranging from about 800 nm to about 1000 nm. Such a setting is conductive to obtaining a high-brightness projection screen and reducing the aperture requirement for the projection lens assembly.

In the exemplary implementations, the projection lens assembly of the present disclosure may satisfy the conditional expression $0.9<\mathrm{TAN}(\mathrm{HFOV})<1.2$. Here, HFOV is the half of the maximal field-of-view of the prejection lens assembly. More specifically, HFOV may further satisfy: $0.95 \leq \mathrm{TAN}(\mathrm{HFOV}) \leq 1.04$. When the conditional expression $0.9<\mathrm{TAN}(\mathrm{HFOV})<1.2$ is satisfied, the requirement of the depth recognition area range may be fulfilled and the high recognition accuracy may be maintained.

In the exemplary implementations, the above projection lens assembly may further include at least one diaphragm, to improve the imaging quality of the lens assembly. The diaphragm may be disposed at any position as needed. For example, the diaphragm may be disposed between the image side and the first lens.

Alternatively, the above projection lens assembly may further include other well-known optical projection elements such as prisms and field lenses.

The main difference between the normal lens assembly and the projection lens assembly lies in that for the normal camera lens assembly, the light coming from an object side reaches an image side to form an image plane, and for the projection lens assembly, the light coming from a source side reaches an image side, and an image plane is enlarged and projected to the projection plane. The amount of light entering the normal projection lens assembly is controlled by an object-side numerical aperture and the diaphragm of the lens assembly.

The projection lens assembly according to the above implementations of the present disclosure may use, for example, four lenses. By reasonably setting the refractive powers and the surface types of the lenses, the center thicknesses of the lenses, the axial spacing distances between the lenses, etc., the projection lens assembly has at least one of the beneficial effects such as miniaturization, large field of view, high imaging quality, low sensitivity, and the effect that the depth recognition requirement may be fulfilled.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the projection lens assembly without departing from the technical solution claimed by the present disclosure. For example, although the projection lens assembly having four lenses is described as an example in the implementations, the projection lens assembly is not limited to include four lenses. If desired, the projection lens assembly may also include other numbers of lenses.

Specific embodiments of the projection lens assembly that may be applied to the above implementations are further described below with reference to the accompanying drawings.

Embodiment 1

Figure 1:
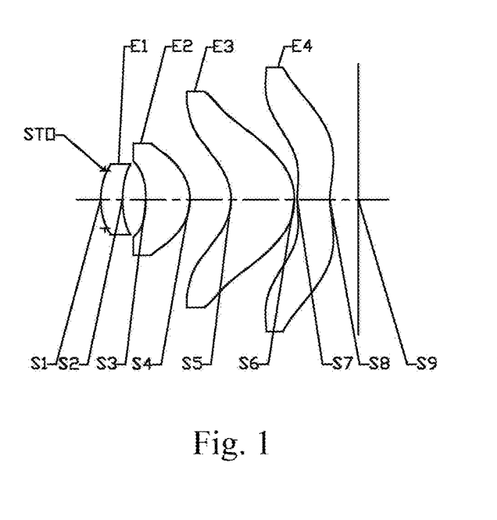
FIG. 1 is a schematic structural diagram illustrating a projection lens assembly according to Embodiment 1 of the present disclosure.

A projection lens assembly according to Embodiment 1 of the present disclosure is described below with reference to FIGS. 1-2C. FIG. 1 is a schematic structural diagram illustrating the project on lens assembly according to Embodiment 1 of the present disclosure.

As shown in FIG. 1, the projection lens assembly according to the exemplary implementations of the present disclosure includes, sequentially along an optical axis from an image side to a source side, a diaphragm STO, a first lens E1, a second lens E2, a third lens E3, and a fourth lens E4.

The first lens E1 has a positive refractive power, an image-side surface S1 of the first lens E1 is a convex surface, and a source-side surface S2 of the first lens E1 is a concave surface. The second lens E2 has a positive refractive power, an image-side surface S3 of the second lens E2 is a concave surface, and a source-side surface S4 of the second lens E2 is a convex surface. The third lens E3 has a positive refractive power, an image-side surface S5 of the third lens E3 is a concave surface, and a source-side surface S6 of the third lens E3 is a convex surface. The fourth lens E4 has a negative refractive power, an image-side surface S7 of the fourth lens E4 is a convex surface, and a source-side surface S8 of the fourth lens E4 is a concave surface. S9 may be a source plane. Light from the source plane of the projection lens assembly sequentially passes through the surfaces S1-S8 and finally forms an image on a screen (not shown).

A light transmittance of the projection lens assembly is greater than 85% in a light wave ranging from about 800 nm to about 1000 nm.

Table 1 shows the surface type, the radius of curvature, the thickness, the material and the conic coefficient of each lens of the projection lens assembly in Embodiment 1. The units of the radius of curvature and the thickness are both millimeters (mm).

TABLE 1

| surface number | surface type | radius of curvature | thickness | material refractive index | abbe number | conic coefficient |
|---|---|---|---|---|---|---|
| IMA | spherical | infinite | infinite | | | |
| STO | spherical | infinite | −0.0484 | | | |
| S1 | aspheric | 0.8090 | 0.2447 | 1.62 | 23.5 | 0.8541 |
| S2 | aspheric | 1.1446 | 0.2626 | | | −1.0000 |
| S3 | aspheric | −1.2018 | 0.4955 | 1.53 | 55.8 | 3.7742 |
| S4 | aspheric | −0.5302 | 0.4669 | | | −0.5677 |
| S5 | aspheric | −0.5398 | 0.7093 | 1.62 | 23.5 | −2.2018 |
| S6 | aspheric | −0.6962 | 0.0300 | | | −0.7948 |
| S7 | aspheric | 0.8514 | 0.3656 | 1.53 | 55.8 | −99.0000 |
| S8 | aspheric | 0.4564 | 0.3208 | | | −40.9339 |
| S9 | spherical | infinite | | | | |

As may be obtained from Table 1, the image-side surface and the source-side surface of each lens in the first to fourth lenses E1-E4 are both aspheric surfaces. In this embodiment, the surface type x of each aspheric surface may be defined using, but not limited to, the following formula:

$$x = \frac{ch^2}{1 + \sqrt{1 - (k+1)c^2h^2}} + \Sigma\, A_i h^i. \quad (1)$$

Here, x is the sag to the aspheric vertex, when the aspheric surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S8 in Embodiment 1.

TABLE 2

| surface number | A4 | A6 | A8 | A10 | A12 | A14 | A16 |
|---|---|---|---|---|---|---|---|
| S1 | 1.5615E−01 | −4.1916E+00 | 1.0055E+02 | −1.0841E+03 | 5.7844E+03 | −1.4246E+04 | 1.2976E+04 |
| S2 | 4.9464E−01 | 6.9931E−01 | 1.4940E+01 | −1.8713E+02 | 1.8504E+03 | −8.8115E+03 | 1.9038E+04 |
| S3 | −4.1066E−01 | −2.8918E+01 | 5.3999E+02 | −5.5399E+03 | 2.9869E+04 | −8.1639E+04 | 9.0669E+04 |
| S4 | −2.8917E−01 | 7.5873E+00 | −9.6838E+01 | 6.3678E+02 | −2.2453E+03 | 3.9455E+03 | −2.6261E+03 |
| S5 | −3.7771E−01 | −1.0334E+00 | 6.5029E+00 | −1.0025E+01 | 7.1543E+00 | −2.4772E+00 | 3.3604E−01 |
| S6 | −1.1253E+00 | 4.5667E+00 | −1.0239E+01 | 1.3167E+01 | −8.9996E+00 | 3.0492E+00 | −4.0198E−01 |
| S7 | −1.5132E+00 | 1.9426E+00 | −9.7812E−01 | 6.1994E−02 | 1.5356E−01 | −6.4488E−02 | 8.2865E−03 |
| S8 | −4.8483E−01 | 3.1658E−02 | 3.9269E−01 | −4.0333E−01 | 1.9364E−01 | −4.5723E−02 | 4.1905E−03 |

Table 3 shows the total track length TTL (i.e., the distance on the optical axis from the image-side surface S1 of the first lens E1 to the source plane S9) of the projection lens assembly in Embodiment 1, the half of the maximal field-of-view HFOV, the total effective focal length f, and the effective focal lengths f1-f4 of the lenses.

TABLE 3

| parameter | | | | | | |
|---|---|---|---|---|---|---|
| TTL mm | HFOV (°) | f (mm) | f1 (mm) | f2 (mm) | f3 (mm) | f4 (mm) |
| numerical value 2.90 | 46.2 | 1.75 | 3.48 | 1.43 | 5.26 | −2.74 |

The projection lens assembly in Embodiment 1 satisfies:

(1+TAN(CRA))*TTL/IH=2.12, where CRA is the maximum incident angle of the chief ray, TTL is the total track length of the projection lens assembly, and IH is the half of the diagonal length of the source area;

|f1/f2|=2.43, where f1 is the effective focal length of the first lens E1, and f2 is the effective focal length of the second lens E2;

R4/R5=0.98, where R4 is the radius of curvature of the source-side surface S4 of the second lens E2 and R5 is the radius of curvature of the image-side surface S5 of the third lens E3;

SAG31/SAG32=0.50, where SAG31 is the distance on the optical axis from the intersection between the image-side surface S5 of the third lens E3 and the optical axis to the vertex of the effective semi-diameter of the image-side surface S5 of the third lens E3, and SAC32 is the distance on the optical axis from the intersection between the source-side surface S6 of the third lens E3 and the optical axis to the vertex of the effective semi-diameter of the source-side surface s6 of the third lens E3;

DT11/DT21=0.89, where DT11 is the effective semi-diameter of the image-side surface S1 of the first lens E1, and DT21 is the effective semi-diameter of the source-side surface S2 of the first lens E1;

CT3/CT4=1.94, where CT3 is the center thickness of the third lens E3 on the optical axis and CT4 is the center thickness of the fourth lens E4 on the optical axis;

T12/T23=0.56, where T12 is the spacing distance on the optical axis between the first lens E1 and the second lens E2 and T23 is the spacing distance on the optical axis between the second lens E2 and the third lens E3; and TAN(HFOV)=1.04, where HFOV is the half of the maximal field-of-view of the prejection lens assembly.

Figure 2A:
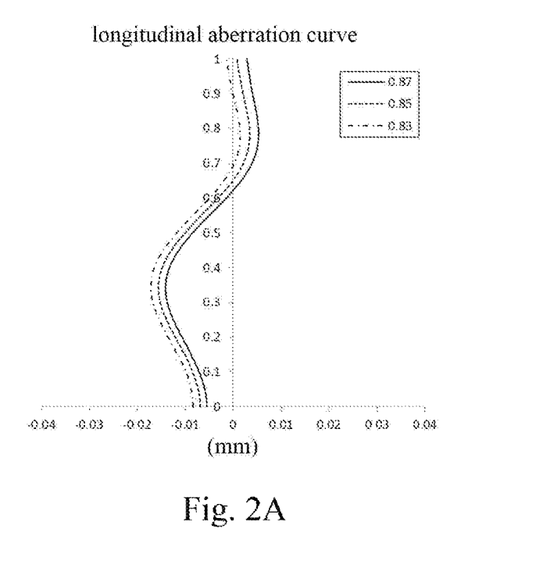
FIGS. 2A-2C respectively illustrate a longitudinal aberration curve, an astigmatic curve, and a distortion curve of the projection lens assembly according to Embodiment 1.
Figure 2B:
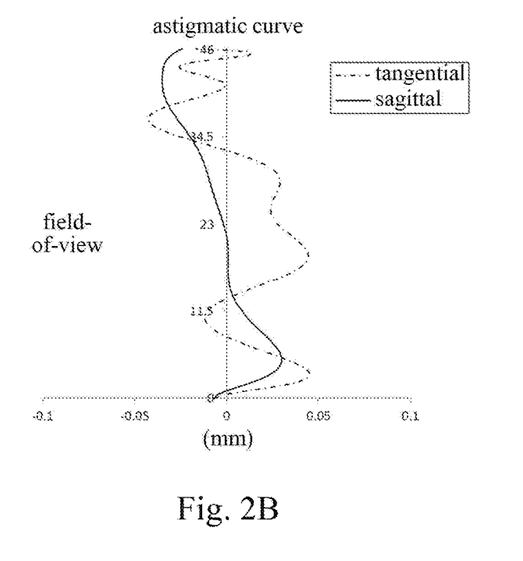
Figure 2C:
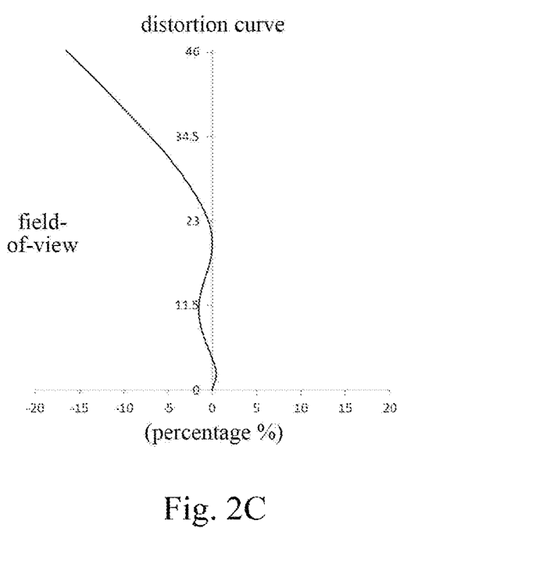

FIG. 2A illustrates the longitudinal aberration curve of the projection lens assembly according to Embodiment 1, representing deviations of focal points where lights of different wavelengths converge after passing through the lens assembly. FIG. 2B illustrates the astigmatic curve of the projection lens assembly according to Embodiment 1, representing a curvature of the tangential image plane and a curvature of the sagittal image plane. FIG. 2C illustrates the distortion curve of the projection lens assembly according to Embodiment 1, representing degrees of distortion at different viewing angles. It can be seen from FIGS. 2A-2C that the projection lens assembly according to Embodiment 1 can achieve a good imaging quality.

Embodiment 2

Figure 3:
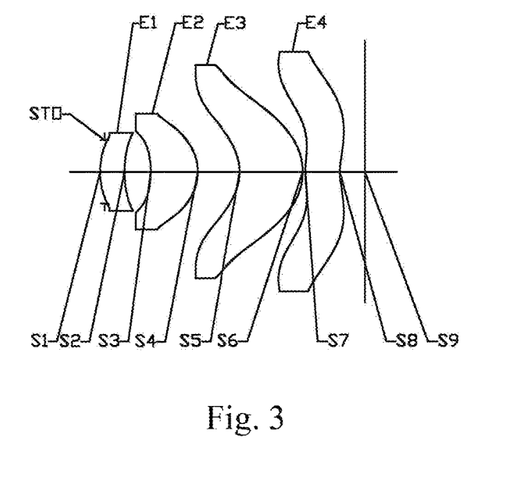
FIG. 3 is a schematic structural diagram illustrating a projection lens assembly according to Embodiment 2 of the present disclosure.

A projection lens assembly according to Embodiment 2 of the present disclosure is described below with reference to FIGS. 3-4C. In this embodiment and the following embodiments, for the purpose of brevity, the description of parts similar to those in Embodiment 1 will be omitted. FIG. 3 is a schematic structural diagram illustrating the projection lens assembly according to Embodiment 2 of the present disclosure.

As shown in FIG. 3, the projection lens assembly according to the exemplary implementations of the present disclosure includes, sequentially along an optical axis from an image side to a source side, a diaphragm STO, a first lens E1, a second lens E2, a third lens E3, and a fourth lens E4.

The first lens E1 has a positive refractive power, an image-side surface S1 of the first lens E1 is a convex surface, and a source-side surface S2 of the first lens E1 is a concave surface. The second lens E2 has a positive refractive power, an image-side surface S3 of the second lens E2 is a concave surface, and a source-side surface S4 of the second lens E2 is a convex surface. The third lens E3 has a positive refractive power, an image-side surface S5 of the third lens E3 is a concave surface, and a source-side surface S6 of the third lens E3 is a convex surface. The fourth lens E4 has a negative refractive power, an image-side surface S7 of the fourth lens E4 is a convex surface, and a source-side surface S8 of the fourth lens E4 is a concave surface. S9 may be a source plane. Light from the source plane of the projection lens assembly sequentially passes through the surfaces S1-S8 and finally forms an image on a screen (not shown).

A light transmittance of the projection lens assembly is greater than 85% in a light wave ranging from about 800 nm to about 1000 nm.

Table 4 shows the surface type, the radius of curvature, the thickness, the material and the conic coefficient of each lens of the projection lens assembly in Embodiment 2. The units of the radius of curvature and the thickness are both millimeters (mm).

TABLE 4

| | | | | material | | |
|---|---|---|---|---|---|---|
| surface number | surface type | radius of curvature | thickness | refractive index | abbe number | conic coefficient |
| IMA | spherical | infinite | infinite | | | |
| STO | spherical | infinite | −0.0484 | | | |
| S1 | aspheric | 0.8517 | 0.2653 | 1.62 | 23.5 | −0.6659 |
| S2 | aspheric | 1.2648 | 0.2845 | | | 2.3787 |
| S3 | aspheric | −1.1259 | 0.5133 | 1.53 | 55.8 | 3.7212 |
| S4 | aspheric | −0.5120 | 0.4589 | | | −0.5697 |
| S5 | aspheric | −0.5300 | 0.6857 | 1.62 | 23.5 | −2.2350 |
| S6 | aspheric | −0.6969 | 0.0300 | | | −0.7946 |
| S7 | aspheric | 0.8974 | 0.3740 | 1.53 | 55.8 | −72.0392 |
| S8 | aspheric | 0.4000 | 0.2738 | | | −38.4469 |
| S9 | spherical | infinite | | | | |

As may be obtained from Table 4, in Embodiment 2, the image-side surface and the source-side surface of each lens in the first to fourth lenses E1-E4 are both aspheric surfaces. Table 5 shows the high-order coefficients applicable to each aspheric surface in Embodiment 2. The surface type of each aspheric surface may be defined by the formula (1) given in Embodiment 1.

TABLE 5

| surface number | A4 | A6 | A8 | A10 | A12 | A14 | A16 |
|---|---|---|---|---|---|---|---|
| S1 | 5.8004E−01 | −8.6984E+00 | 1.7481E+02 | −7.4245E+02 | −1.3055E+04 | 1.5452E+05 | −4.6982E+05 |
| S2 | 1.1649E−01 | 5.0713E+00 | −7.7669E+01 | 6.2275E+02 | −1.5735E+03 | −7.0330E+02 | 0.0000E+00 |
| S3 | −4.3396E−01 | −2.8939E+01 | 5.4167E+02 | −5.5339E+03 | 2.9901E+04 | −8.1363E+04 | −9.2991E+04 |
| S4 | −2.6746E−01 | 7.6096E+00 | −9.6765E+01 | 6.3707E+02 | −2.2443E+03 | 3.9475E+03 | −2.6135E+03 |
| S5 | −3.7659E−01 | −1.0333E+00 | 6.5034E+00 | −1.0024E+01 | 7.1554E+00 | −2.4757E+00 | 3.3877E−01 |
| S6 | −1.1248E+00 | 4.5657E+00 | −1.0239E+01 | 1.3167E+01 | −8.9995E+00 | 3.0491E+00 | −4.0221E−01 |
| S7 | −1.4989E+00 | 1.9491E+00 | −9.8034E−01 | 6.4599E−02 | 1.5061E−01 | −6.3319E−02 | 8.1308E−03 |
| S8 | −4.8857E−01 | 3.2148E−02 | 4.0434E−01 | −4.0875E−01 | 1.9894E−01 | −4.8208E−02 | 4.4787E−03 |

Table 6 shows the total track length TTL of the projection lens assembly in Embodiment 2, the half of the maximal field-of-view HFOV, the total effective focal length f, and the effective focal lengths f1-f4 of the lenses.

TABLE 6

| parameter | | | | | | |
|---|---|---|---|---|---|---|
| TTL (mm) | HFOV (°) | f (mm) | f1 (mm) | f2 (mm) | f3 (mm) | f4 (mm) |
| numerical value 2.89 | 43.6 | 1.85 | 3.37 | 1.38 | 6.23 | −1.85 |

Figure 4A:
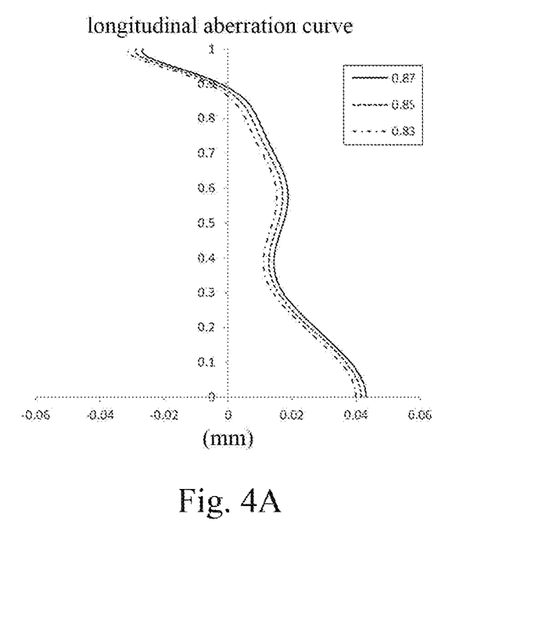
FIGS. 4A-4C respectively illustrate a longitudinal aberration curve, an astigmatic curve, and a distortion curve of the projection lens assembly according to Embodiment 2.
Figure 4B:
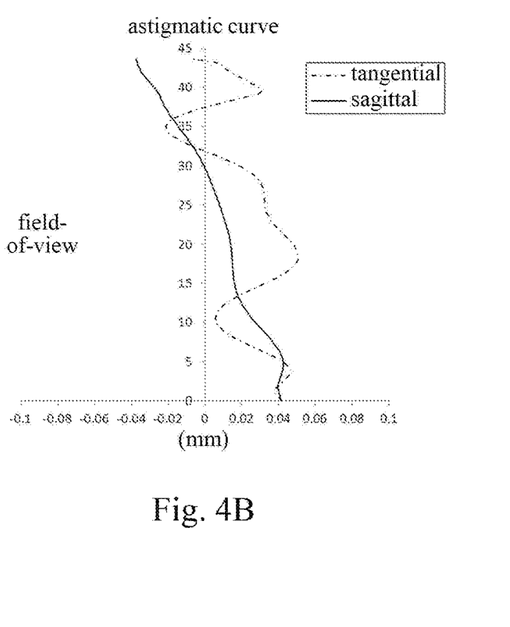
Figure 4C:
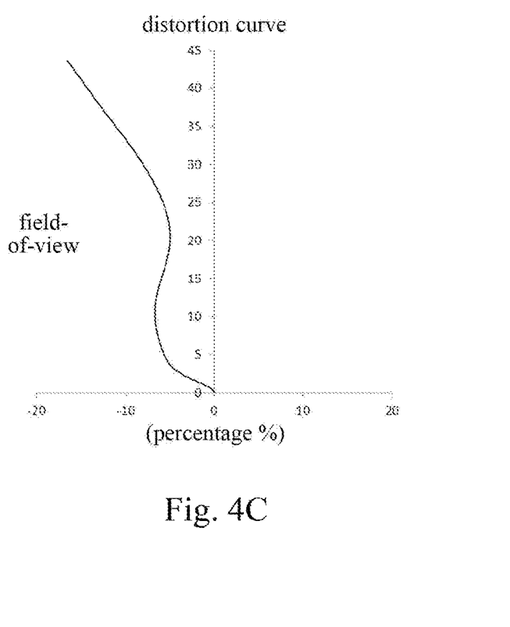

FIG. 4A illustrates the longitudinal aberration curve of the projection lens assembly according to Embodiment 2, representing deviations of focal points where lights of different wavelengths converge after passing through the lens assembly. FIG. 4B illustrates the astigmatic curve of the projection lens assembly according to Embodiment 2, representing a curvature of the tangential image plane and a curvature of the sagittal image plane. FIG. 4C illustrates the distortion curve of the projection lens assembly according to Embodiment 2, representing degrees of distortion at different viewing angles. It can be seen from FIGS. 4A-4C that the projection lens assembly according to Embodiment 2 can achieve a good imaging quality.

Embodiment 3

Figure 5:
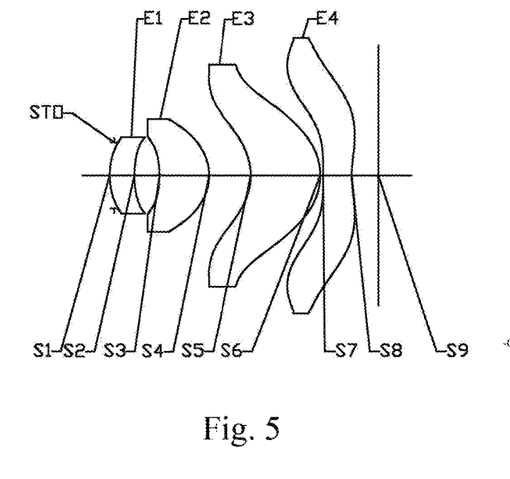
FIG. 5 is a schematic structural diagram illustrating a projection lens assembly according to Embodiment 3 of the present disclosure.

A projection lens assembly according to Embodiment 3 of the present disclosure is described below with reference to FIGS. 5-6C. FIG. 5 is a schematic structural diagram illustrating the projection lens assembly according to Embodiment 3 of the present disclosure.

As shown in FIG. 5, the projection lens assembly according to the exemplary implementations of the present disclosure includes, sequentially along an optical axis from an image side to a source side, a diaphragm STO, a first lens E1, a second lens E2, a third lens E3, and a fourth lens E4.

The first lens E1 has a positive refractive power, an image-side surface S1 of the first lens E1 is a convex surface, and a source-side surface S2 of the first lens E1 is a concave surface. The second lens E2 has a positive refractive power, an image-side surface S3 of the second lens E2 is a concave surface, and a source-side surface S4 of the second lens E2 is a convex surface. The third lens E3 has a positive refractive power, an image-side surface S5 of the third lens E3 is a concave surface, and a source-side surface S6 of the third lens E3 is a convex surface. The fourth lens E4 has a negative refractive power, an image-side surface S7 of the fourth lens E4 is a concave surface, and a source-side surface S8 of the fourth lens E4 is a concave surface. S9 may be a source plane. Light from the source plane of the projection lens assembly sequentially passes through the surfaces S1-S8 and finally forms an image on a screen (not shown).

A light transmittance of the projection lens assembly is greater than 85% in a light wave ranging from about 800 nm to about 1000 nm.

Table 7 shows the surface type, the radius of curvature, the thickness, the material and the conic coefficient of each lens of the projection lens assembly in Embodiment 3. The units of the radius of curvature and the thickness are both millimeters (mm).

TABLE 7

| surface number | surface type | radius of curvature | thickness | material refractive index | abbe number | conic coefficient |
|---|---|---|---|---|---|---|
| IMA | spherical | infinite | infinite | | | |
| STO | spherical | infinite | −0.0484 | | | |
| S1 | aspheric | 0.7544 | 0.2591 | 1.62 | 23.5 | −1.1806 |
| S2 | aspheric | 1.0887 | 0.2618 | | | 3.4269 |
| S3 | aspheric | −1.1329 | 0.5221 | 1.53 | 55.8 | 4.1597 |
| S4 | aspheric | −0.5030 | 0.4408 | | | −0.5301 |
| S5 | aspheric | −0.6069 | 0.7281 | 1.62 | 23.5 | −1.8302 |
| S6 | aspheric | −0.6565 | 0.0300 | | | −0.7988 |
| S7 | aspheric | −87.6520 | 0.2991 | 1.53 | 55.8 | −72.4020 |
| S8 | aspheric | 0.7315 | 0.2803 | | | −50.0006 |
| S9 | spherical | infinite | | | | |

As may be obtained from Table 7, in Embodiment 3, the image-side surface and the source-side surface of each lens in the first to fourth lenses E1-E4 are both aspheric surfaces. Table 8 shows the high-order coefficients applicable to each aspheric surface in Embodiment 3. The surface type of each aspheric surface may be defined by the formula (1) given in Embodiment 1.

TABLE 8

| surface number | A4 | A6 | A8 | A10 | A12 | A14 | A16 |
|---|---|---|---|---|---|---|---|
| S1 | 3.6418E−01 | −4.2484E+00 | 1.7253E+02 | −7.6872E+02 | −1.3616E+04 | 1.5380E+05 | −4.3657E+05 |
| S2 | 2.7243E−01 | 3.4752E+00 | −6.0200E+01 | 6.5103E+02 | −1.5180E+03 | −1.2495E+03 | 0.0000E+00 |
| S3 | −5.1748E−01 | −2.9525E+01 | 5.3533E+02 | −5.5151E+03 | 3.0152E+04 | −7.9913E+04 | 9.7487E+04 |

TABLE 8-continued

| surface number | A4 | A6 | A8 | A10 | A12 | A14 | A16 |
|---|---|---|---|---|---|---|---|
| S4 | −2.1095E−01 | 7.5296E+00 | −9.7206E+01 | 6.3590E+02 | −2.2444E+03 | 3.9587E+03 | −2.6054E+03 |
| S5 | −2.7582E−01 | −1.0365E+00 | 6.4469E+00 | −1.0020E+01 | 7.1576E+00 | −2.4712E+00 | 3.4350E−01 |
| S6 | −1.0491E+00 | 4.4781E+00 | −1.0164E+01 | 1.3186E+01 | −9.0173E+00 | 3.0361E+00 | −3.9036E−01 |
| S7 | −1.4776E+00 | 1.9597E+00 | −9.8528E−01 | 6.4358E−02 | 1.5180E−01 | −6.3891E−02 | 8.2018E−03 |
| S8 | −4.8982E−01 | 2.9768E−02 | 4.0658E−01 | −4.0842E−01 | 1.9888E−01 | −4.8349E−02 | 4.3821E−03 |

Table 9 shows the total track length TTL of the projection lens assembly in Embodiment 3, the half of the maximal field-of-view HFOV, the total effective focal length f, and the effective focal lengths f1-f4 of the lenses.

TABLE 9

| parameter | | | | | | |
|---|---|---|---|---|---|---|
| TTL (mm) | HFOV (°) | f (mm) | f1 (mm) | f2 (mm) | f3 (mm) | f4 (mm) |
| 2.82 | 43.6 | 1.97 | 3.05 | 1.33 | 2.80 | −1.37 | numerical value

Figure 6A:
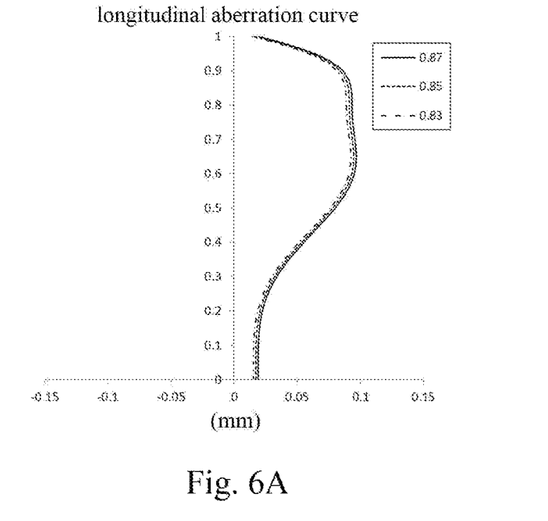
FIGS. 6A-6C respectively illustrate a longitudinal aberration curve, an astigmatic curve, and a distortion curve of the projection lens assembly according to Embodiment 3.
Figure 6B:
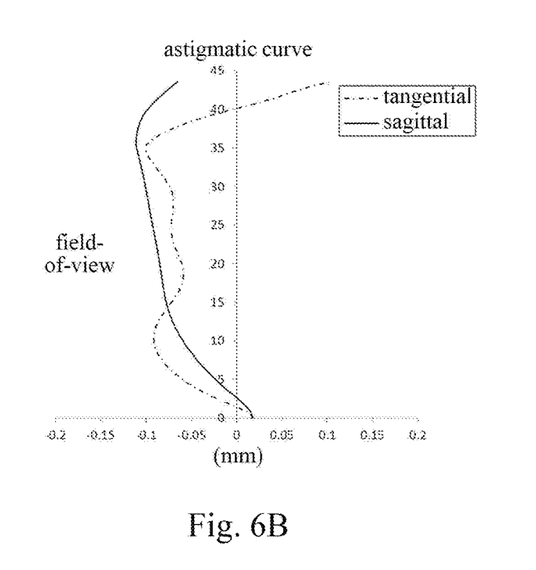
Figure 6C:
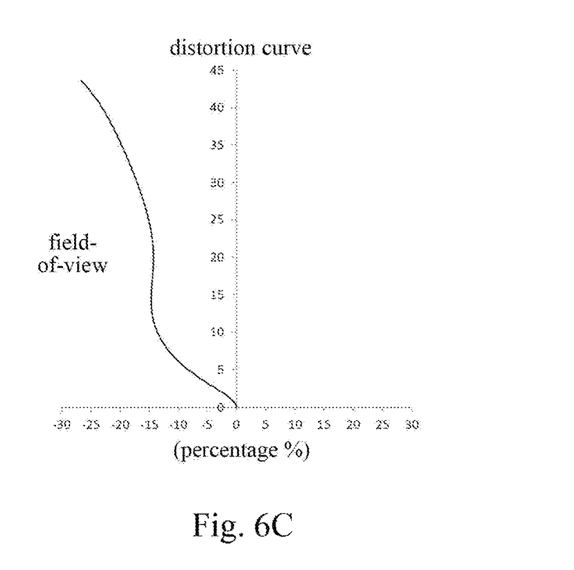

FIG. 6A illustrates the longitudinal aberration curve of the projection lens assembly according to Embodiment 3, representing deviations of focal points where lights of different wavelengths converge after passing through the lens assembly. FIG. 6B illustrates the astigmatic curve of the projection lens assembly according to Embodiment 3, representing a curvature of the tangential image plane and a curvature of the sagittal image plane. FIG. 6C illustrates the distortion curve of the projection lens assembly according to Embodiment 3, representing degrees of distortion at different viewing angles. It can be seen from FIGS. 6A-6C that the projection lens assembly according to Embodiment 3 can achieve a good imaging quality.

Embodiment 4

Figure 7:
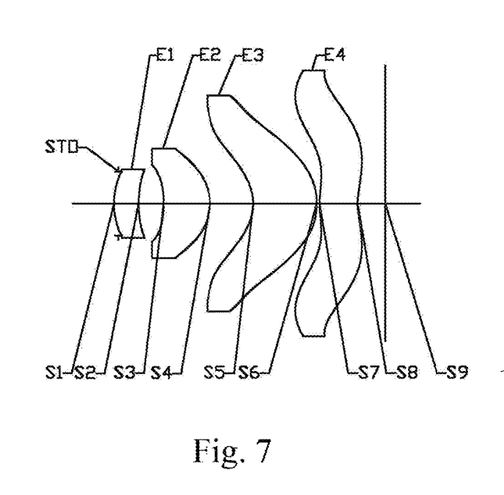
FIG. 7 is a schematic structural diagram illustrating a projection lens assembly according to Embodiment 4 of the present disclosure.
Figure 8A:
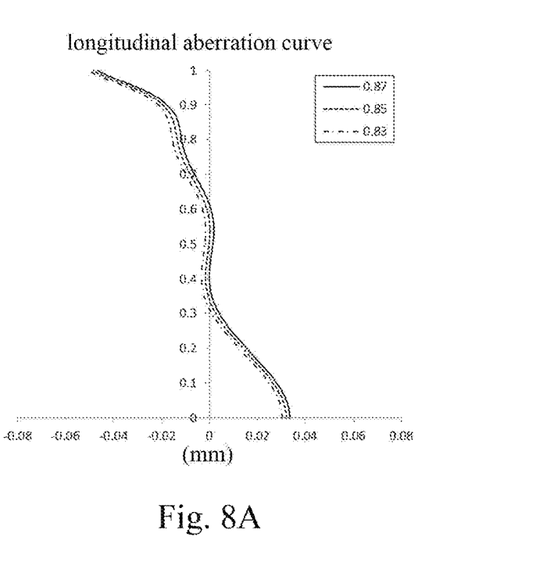
FIGS. 8A-8C respectively illustrate a longitudinal aberration curve, an astigmatic curve, and a distortion curve of the projection lens assembly according to Embodiment 4.
Figure 8B:
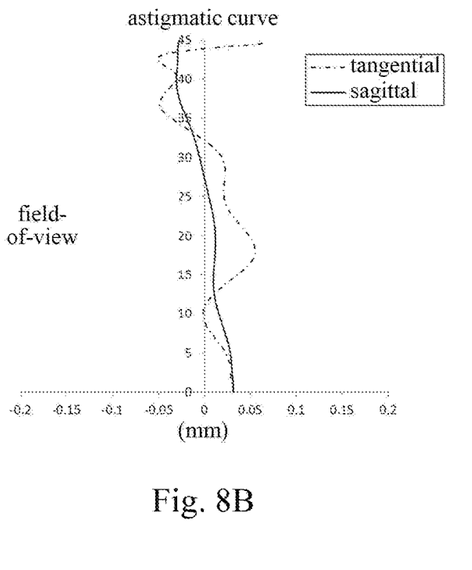
Figure 8C:
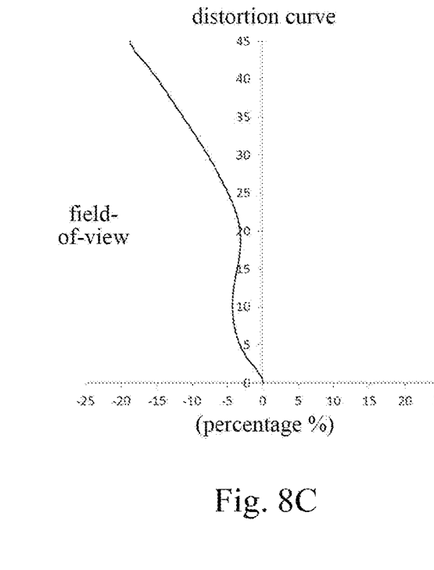

A projection lens assembly according to Embodiment 4 of the present disclosure is described below with reference to FIGS. 7-8C, FIG. 7 is a schematic structural diagram illustrating the projection lens assembly according to Embodiment 4 of the present disclosure.

As shown in FIG. 7, the projection lens assembly according to the exemplary implementations of the present disclosure includes, sequentially along an optical axis from an image side to a source side, a diaphragm STO, a first lens E1, a second lens E2, a third lens E3, and a fourth lens E4.

The first lens E1 has a positive refractive power, an image-side surface S1 of the first lens E1 is a convex surface, and a source-side surface S2 of the first lens E1 is a concave surface. The second lens E2 has a positive refractive power, an image-side surface S3 of the second lens E2 is a concave surface, and a source-side surface S4 of the second lens E2 is a convex surface. The third lens E3 has a positive refractive power, an image-side surface S5 of the third lens E3 is a concave surface, and a source-side surface S6 of the third lens E3 is a convex surface. The fourth lens E4 has a negative refractive power, an image-side surface S7 of the fourth lens E4 is a convex surface, and a source-side surface S8 of the fourth lens E4 is a concave surface. S9 may be a source plane. Light from the source plane of the projection lens assembly sequentially passes through the surfaces S1-S8 and finally forms an image on a screen (not shown).

A light transmittance of the projection lens assembly is greater than 85% in a light wave ranging from about 800 nm to about 1000 nm.

Table 10 shows the surface type, the radius of curvature, the thickness, the material and the conic coefficient of each lens of the projection lens assembly in Embodiment 4. The units of the radius of curvature and the thickness are both millimeters (mm).

TABLE 10

| surface number | surface type | radius of curvature | thickness | material | | conic coefficient |
|---|---|---|---|---|---|---|
| | | | | refractive index | abbe number | |
| IMA | spherical | infinite | infinite | | | |
| STO | spherical | infinite | −0.0484 | | | |
| S1 | aspheric | 0.8382 | 0.2651 | 1.62 | 23.5 | −0.8574 |
| S2 | aspheric | 1.2272 | 0.2703 | | | 1.6997 |
| S3 | aspheric | −1.1469 | 0.5008 | 1.53 | 55.8 | 3.3922 |
| S4 | aspheric | −0.5095 | 0.4689 | | | −0.6006 |
| S5 | aspheric | −0.4777 | 0.6853 | 1.62 | 23.5 | −2.4764 |
| S6 | aspheric | −0.7308 | 0.0300 | | | −0.7883 |
| S7 | aspheric | 1.0236 | 0.4101 | 1.53 | 55.8 | −37.8494 |
| S8 | aspheric | 0.5801 | 0.2979 | | | −30.0884 |
| S9 | spherical | infinite | | | | |

As may be obtained from Table 10, in Embodiment 4, the image-side surface and the source-side surface of each lens in the first to fourth lenses E1-E4 are both aspheric surfaces. Table 11 shows the high-order coefficients applicable to each aspheric surface in Embodiment 4. The surface type of each aspheric surface may be defined by the formula (1) given in Embodiment 1.

TABLE 11

| surface number | A4 | A6 | A8 | A10 | A12 | A14 | A16 |
|---|---|---|---|---|---|---|---|
| S1 | 5.3149E−01 | −8.3884E+00 | 1.7885E+02 | −7.5712E+02 | −1.3476E+04 | 1.5316E+05 | −4.4688E+05 |
| S2 | 3.6122E−02 | 5.7148E+00 | −8.0089E+01 | 5.7882E+02 | −1.6399E+03 | 3.7888E+02 | 0.0000E+00 |
| S3 | −3.1367E−01 | −2.8910E+01 | 5.4553E+02 | −5.5178E+03 | 2.9882E+04 | −8.1978E+04 | 8.7675E+04 |
| S4 | −9.0248E−02 | 7.2188E+00 | −9.6116E+01 | 6.3941E+02 | −2.2421E+03 | 3.9436E+03 | −2.6396E+03 |
| S5 | −3.7940E−01 | −1.0355E+00 | 6.5031E+00 | −1.0026E+01 | 7.1514E+00 | −2.4784E+00 | 3.3924E−01 |
| S6 | −1.1388E+00 | 4.5679E+00 | −1.0241E+01 | 1.3165E+01 | −9.0009E+00 | 3.0484E+00 | −4.0259E−01 |

TABLE 11-continued

| surface number | A4 | A6 | A8 | A10 | A12 | A14 | A16 |
|---|---|---|---|---|---|---|---|
| S7 | −1.5062E+00 | 1.9490E+00 | −9.7977E−01 | 6.5003E−02 | 1.5082E−01 | −6.3256E−02 | 8.1176E−03 |
| S8 | −4.9308E−01 | 2.9134E−02 | 4.0407E−01 | −4.0863E−01 | 1.9907E−01 | −4.8110E−02 | 4.5562E−03 |

Table 12 shows the total track length TTL of the projection lens assembly in Embodiment 4, the half of the maximal field-of-view HFOV, the total effective focal length f, and the effective focal lengths f1-f4 of the lenses.

TABLE 12

| | parameter | | | | | | |
|---|---|---|---|---|---|---|---|
| | TTL (mm) | HFOV (°) | f (mm) | f1 (mm) | f2 (mm) | f3 (mm) | f4 (mm) |
| numerical value | 2.93 | 45.0 | 1.87 | 3.38 | 1.37 | 60.53 | −3.73 |

FIG. 8A illustrates the longitudinal aberration curve of the projection lens assembly according to Embodiment 4, representing deviations of focal points where lights of different wavelengths converge after passing through the lens assembly. FIG. 8B illustrates the astigmatic curve of the projection lens assembly according to Embodiment 4, representing a curvature of the tangential image plane and a curvature of the sagittal plane. FIG. 8C illustrates the distortion curve of the projection lens assembly according to Embodiment 4, representing degrees of distortion at different viewing angles. It can be seen from FIGS. 8A-8C that the projection lens assembly according to Embodiment 4 can achieve a good imaging quality.

Embodiment 5

Figure 9:
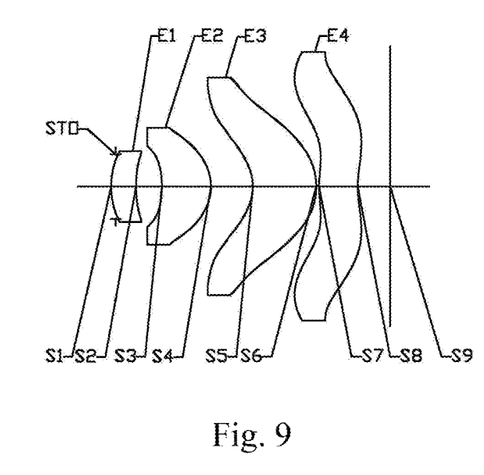
FIG. 9 is a schematic structural diagram illustrating a projection lens assembly according to Embodiment 5 of the present disclosure.

A projection lens assembly according to Embodiment 5 of the present disclosure is described below with reference to FIGS. 9-10C. FIG. 9 is a schematic structural diagram illustrating the projection lens assembly according to Embodiment 5 of the present disclosure.

As shown in FIG. 9, the projection lens assembly according to the exemplary implementations of the present disclosure includes, sequentially along an optical axis from an image side to a source side, a diaphragm STO, a first lens E1, a second lens E2, a third lens E3, and a fourth lens E4.

The first lens E1 has a positive refractive power, an image-side surface S1 of the first lens E1 is a convex surface, and a source-side surface S2 of the first lens E1 is a concave surface. The second lens E2 has a positive refractive power, an image-side surface 33 of the second lens E2 is a concave surface, and a source-side surface S4 of the second lens E2 is a convex surface. The third lens E3 has a positive refractive power, an image-side surface S5 of the third lens E3 is a concave surface, and a source-side surface S6 of the third lens E3 is a convex surface. The fourth lens E4 has a positive refractive power, an image-side surface S7 of the fourth lens E4 is a convex surface, and a source-side surface S8 of the fourth lens E4 is a concave surface. S9 may be a source plane. Light from the source plane of the projection lens assembly sequentially passes through the surfaces S1-S8 and finally forms an image on a screen (not shown).

A light transmittance of the projection lens assembly is greater than 85% in a light wave ranging from about 800 nm to about 1000 nm.

Table 13 shows the surface type, the radius of curvature, the thickness, the material and the conic coefficient, of each lens of the projection lens assembly in Embodiment 5. The units of the radius of curvature and the thickness are both millimeters (mm).

TABLE 13

| surface number | surface type | radius of curvature | thickness | material refractive index | abbe number | conic coefficient |
|---|---|---|---|---|---|---|
| IMA | spherical | infinite | infinite | | | |
| STO | spherical | infinite | −0.0484 | | | |
| S1 | aspheric | 0.8778 | 0.2651 | 1.62 | 23.5 | −1.0001 |
| S2 | aspheric | 1.2920 | 0.2754 | | | 1.1798 |
| S3 | aspheric | −1.1142 | 0.5239 | 1.53 | 55.8 | 3.7760 |
| S4 | aspheric | −0.5042 | 0.4518 | | | −0.5883 |
| S5 | aspheric | −0.4792 | 0.6760 | 1.62 | 23.5 | −2.5853 |
| S6 | aspheric | −0.7208 | 0.0300 | | | −0.7948 |
| S7 | aspheric | 1.1466 | 0.4123 | 1.53 | 55.8 | −32.5486 |
| S8 | aspheric | 1.0100 | 0.3455 | | | −25.6013 |
| S9 | spherical | infinite | | | | |

As may be obtained from Table 13, in Embodiment 5, the image-side surface and the source-side surface of each lens in the first to fourth lenses E1-E4 are both aspheric surfaces. Table 14 shows the high-order coefficients applicable to each aspheric surface in Embodiment 5. The surface type of each aspheric surface may be defined by the formula (1) given in Embodiment 1.

TABLE 14

| surface number | A4 | A6 | A8 | A10 | A12 | A14 | A16 |
|---|---|---|---|---|---|---|---|
| S1 | 5.0519E−01 | −8.6079E+00 | 1.8062E+02 | −7.2450E+02 | −1.3482E+04 | 1.5082E+05 | −4.3927E+05 |
| S2 | −9.8834E−03 | 5.8792E+00 | −7.5804E+01 | 5.7759E+02 | −1.9467E+03 | 2.1590E+03 | 0.0000E+00 |
| S3 | −3.1328E−01 | −2.9784E+01 | 5.4264E+02 | −5.5215E+03 | 2.9905E+04 | −8.1677E+04 | 9.0278E+04 |
| S4 | −9.1581E−02 | 7.0852E+00 | −9.6316E+00 | 6.3912E+02 | −2.2428E+03 | 3.9412E+03 | −2.6493E+03 |
| S5 | −3.7945E−01 | −1.0358E+00 | 6.5023E+00 | −1.0028E+01 | 7.1498E+00 | −2.4795E+00 | 3.4191E−01 |
| S6 | −1.1307E+00 | 4.5723E+00 | −1.0240E+01 | 1.3165E+01 | −9.0007E+00 | 3.0486E+00 | −4.0225E−01 |
| S7 | −1.5099E+00 | 1.9490E+00 | −9.7984E−01 | 6.4954E−02 | 1.5081E−01 | −6.3254E−02 | 8.1228E−03 |
| S8 | −4.8520E−01 | 2.9035E−02 | 4.0341E−01 | −4.0887E−01 | 1.9901E−01 | −4.8124E−02 | 4.5537E−03 |

Table 15 shows the total track length TTL of the projection lens assembly in Embodiment 5, the half of the maximal field-of-view HFOV, the total effective focal length f, and the effective focal lengths f1-f4 of the lenses.

TABLE 15

| | parameter | | | | | |
|---|---|---|---|---|---|---|
| TTL (mm) | HFOV (°) | f (mm) | f1 (mm) | f2 (mm) | f3 (mm) | f4 (mm) |
| numerical value 2.98 | 45.4 | 1.70 | 3.55 | 1.35 | 32.35 | 380.27 |

Figure 10A:
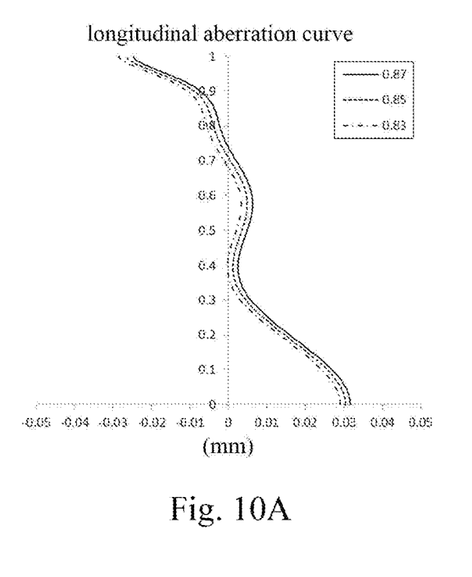
FIGS. 10A-10C respectively illustrate a longitudinal aberration curve, an astigmatic curve, and a distortion curve of the projection lens assembly according to Embodiment 5.
Figure 10B:
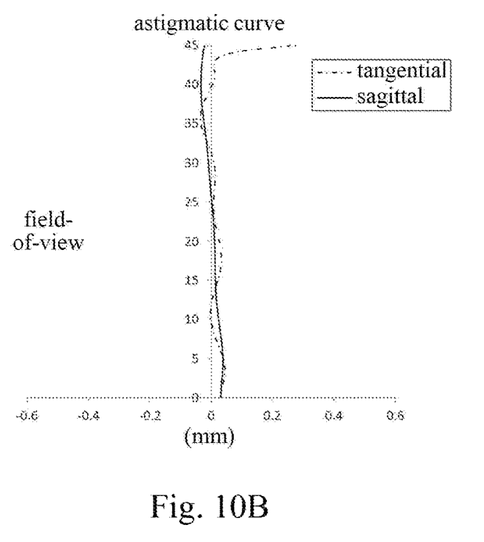
Figure 10C:
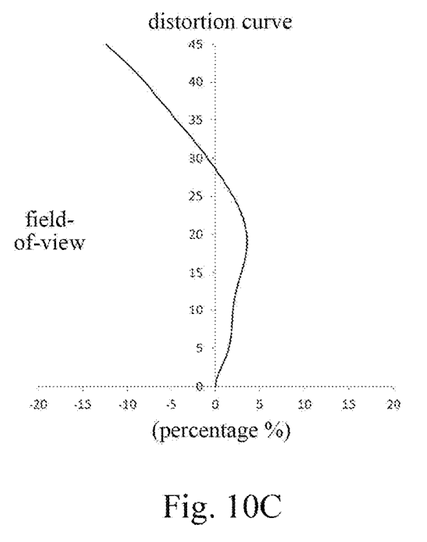

FIG. 10A illustrates the longitudinal aberration curve of the projection lens assembly according to Embodiment 5, representing deviations of focal points where lights of different wavelengths converge after passing through the lens assembly. FIG. 10B illustrates the astigmatic curve of the projection lens assembly according to Embodiment 5, representing a curvature of the tangential image plane and a curvature of the sagittal image plane. FIG. 10C illustrates the distortion curve of the projection lens assembly according to Embodiment 5, representing degrees of distortion at different viewing angles. It can be seen from FIGS. 10A-10C that the projection lens assembly according to Embodiment 5 can achieve a good imaging quality.

To sum up, Embodiments 1-5 respectively satisfy the relationships shown in Table 16 below.

TABLE 16

| | Embodiment | | | | |
|---|---|---|---|---|---|
| Conditional Expression | 1 | 2 | 3 | 4 | 5 |
| (1 + tan(CRA))*TTL/IH | 2.12 | 2.25 | 2.31 | 2.23 | 2.27 |
| \|f1/f2\| | 2.43 | 2.44 | 2.29 | 2.47 | 2.63 |
| R4/R5 | 0.98 | 0.97 | 0.83 | 1.07 | 1.05 |
| SAG31/SAG32 | 0.50 | 0.50 | 0.50 | 0.53 | 0.53 |
| DT11/DT21 | 0.89 | 0.86 | 0.95 | 0.86 | 0.87 |
| CT3/CT4 | 1.94 | 1.83 | 2.43 | 1.67 | 1.64 |
| T12/T23 | 0.56 | 0.62 | 0.59 | 0.58 | 0.61 |
| TAN(HFOV) | 1.04 | 0.95 | 0.95 | 1.00 | 1.02 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A projection lens assembly comprising, sequentially along an optical axis from an image side to a source side, a first lens, a second lens, a third lens, and a fourth lens, wherein
the first lens has a positive refractive power, and an image-side surface of the first lens is a convex surface;
the second lens has a positive refractive power or a negative refractive power, and a source-side surface of the second lens is a convex surface;
the third lens has a positive refractive power;
the fourth lens has a positive refractive power or a negative refractive power, wherein the projection lens assembly includes no more than four lenses, and
the projection lens assembly satisfies: 0<(1+TAN(CRA))*TTL/IH<2.5,
wherein CRA is a maximum incident angle of a chief ray, TTL is a total track length of the projection lens assembly, and IH is a half of a diagonal length of a source area.

2. The projection lens assembly according to claim 1, wherein a half of a maximal field-of-view HFOV of the projection lens assembly satisfies: 0.9<TAN(HFOV)<1.2.

3. The projection lens assembly according to claim 1, wherein a light transmittance of the projection lens assembly is greater than 85% in a light wave ranging from 800 nm to 1000 nm.

4. The projection lens assembly according to claim 1, wherein an effective focal length f1 of the first lens and an effective focal length f2 of the second lens satisfy: 2.0<|f1/f2|<2.8.

5. The projection lens assembly according to claim 1, wherein a radius R4 of curvature of the source-side surface of the second lens and a radius R5 of curvature of an image-side surface of the third lens satisfy: 0.8<R4/R5<1.2.

6. The projection lens assembly according to claim 1, satisfying 0.3<SAG31/SAG32<0.7,
wherein SAG31 is a distance on the optical axis from an intersection between an image-side surface of the third lens and the optical axis to a vertex of an effective semi-diameter of the image-side surface of the third lens, and SAG32 is a distance on the optical axis from an intersection between a source-side surface of the third lens and the optical axis to a vertex of an effective semi-diameter of the source-side surface of the third lens.

7. The projection lens assembly according to claim 1, wherein an effective semi-diameter DT11 of the image-side surface of the first lens and an effective semi-diameter DT21 of a source-side surface of the first lens satisfy: 0.7<DT11/DT21<1.0.

8. The projection lens assembly according to claim 1, wherein a center thickness CT3 of the third lens on the optical axis and a center thickness CT4 of the fourth lens on the optical axis satisfy: 1.5<CT3/CT4<2.5.

9. The projection lens assembly according to claim 1, wherein a spacing distance T12 on the optical axis between the first lens and the second lens and a spacing distance T23 on the optical axis between the second lens and the third lens satisfy: 0.4<T12/T23<0.7.

10. A projection lens assembly comprising, sequentially along an optical axis from an image side to a source side, a first lens, a second lens, a third lens, and a fourth lens, wherein
the first lens has a positive refractive power, and an image-side surface of the first lens is a convex surface;
the second lens has a positive refractive power or a negative refractive power, and a source-side surface of the second lens is a convex surface;
the third lens has a positive refractive power;
the fourth lens has a positive refractive power or a negative refractive power; and
an effective focal length f1 of the first lens and an effective focal length f2 of the second lens satisfy: 2.0<|f1/f2|<2.8, wherein the projection lens assembly includes no more than four lenses.

11. The projection lens assembly according to claim 10, wherein a radius R4 of curvature of the source-side surface of the second lens and a radius R5 of curvature of an image-side surface of the third lens satisfy: 0.8<R4/R5<1.2.

12. The projection lens assembly according to claim 11, satisfying 0<(1+TAN(CRA))*TTL/IH<2.5, wherein CRA is a maximum incident angle of a chief ray, TTL is a total track length of the projection lens assembly, and IH is a half of a diagonal length of a source area.

13. The projection lens assembly according to claim 11, wherein a half of a maximal field-of-view HFOV of the projection lens assembly satisfies: 0.9<TAN(HFOV)<1.2.

14. The projection lens assembly according to claim 11, wherein a light transmittance of the projection lens assembly is greater than 85% in a light wave ranging from 800 nm to 1000 nm.

15. The projection lens assembly according to claim 10, satisfying 0.3<SAG31/SAG32<0.7, wherein SAG31 is a distance on the optical axis from an intersection between an image-side surface of the third lens and the optical axis to a vertex of an effective semi-diameter of the image-side surface of the third lens, and SAG32 is a distance on the optical axis from an intersection between a source-side surface of the third lens and the optical axis to a vertex of an effective semi-diameter of the source-side surface of the third lens.

16. The projection lens assembly according to claim 10, wherein an effective semi-diameter DT11 of the image-side surface of the first lens and an effective semi-diameter DT21 of a source-side surface of the first lens satisfy: 0.7<DT11/DT21<1.0.

17. The projection lens assembly according to claim 10, wherein a center thickness CT3 of the third lens on the optical axis and a center thickness CT4 of the fourth lens on the optical axis satisfy: 1.5<CT3/CT4<2.5.

18. The projection lens assembly according to claim 10, wherein a spacing distance T12 on the optical axis between the first lens and the second lens and a spacing distance T23 on the optical axis between the second lens and the third lens satisfy: 0.4<T12/T23<0.7.

* * * * *